Oct. 2, 1962 J. H. LAUB 3,056,295
FLOW METER
Original Filed July 8, 1955
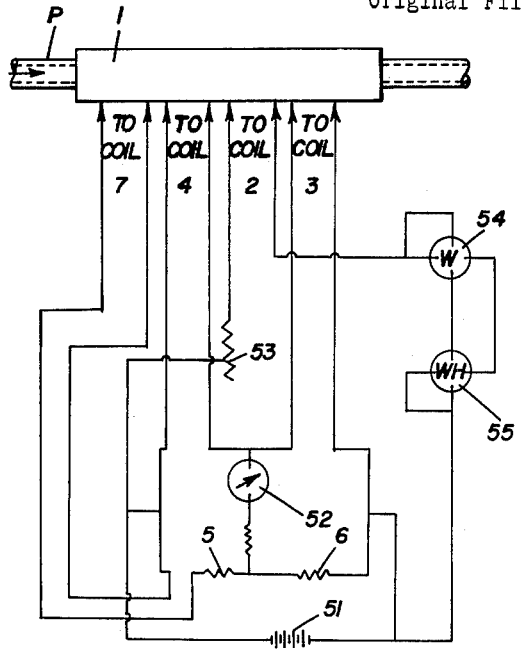
FIG. 1
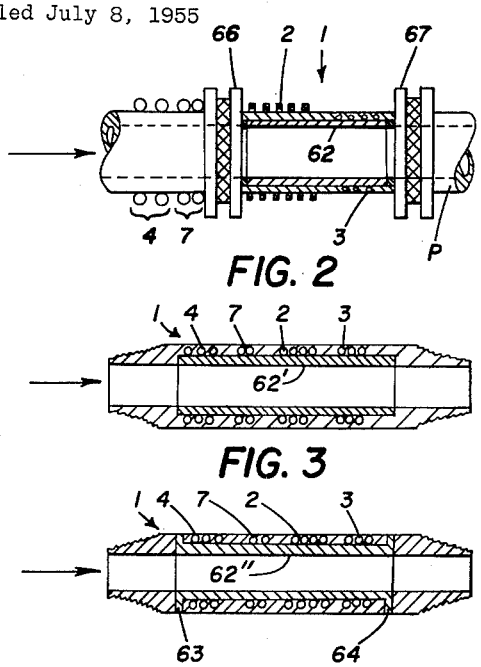
FIG. 2
FIG. 3
FIG. 4
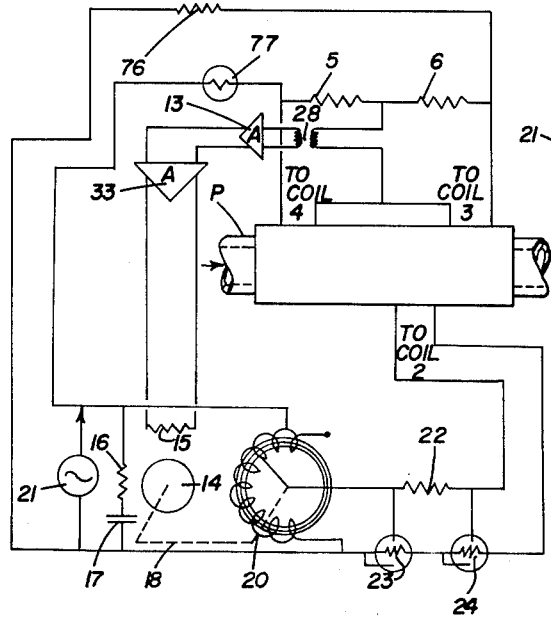
FIG. 5
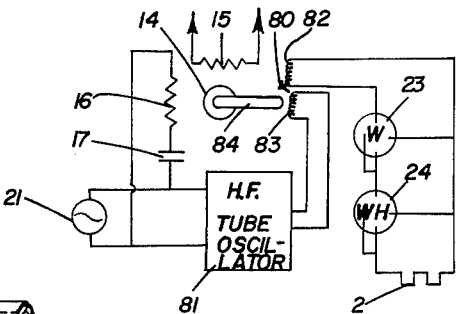
FIG. 6
INVENTOR.
JOHN HARRY LAUB
BY Milton E. Gilbert
ATTORNEY

3,056,295
FLOW METER
John Harry Laub, 1340 El Mirador Drive,
Pasadena, Calif.
Original application July 8, 1955, Ser. No. 520,801, now Patent No. 2,953,022, dated Sept. 20, 1960. Divided and this application Sept. 30, 1959, Ser. No. 843,448
8 Claims. (Cl. 73—204)

This invention relates to a flow meter and is particularly concerned with a device for measuring the rate of flow or quantity of flow of a liquid or other medium flowing through a conduit.

This application is a divisional application of my prior copending application Ser. No. 520,801 filed July 8, 1955 now Patent No. 2,953,022; which in turn was a continuation-in-part of my prior copending applications Ser. No. 671,179 filed on May 21, 1946, now abandoned, and Ser. No. 253,120 filed on October 25, 1951, now abandoned.

The flow meter disclosed in the aforementioned applications is of the electrocaloric or thermal type and has the advantage of allowing free flow with low pressure drop of a flowing medium in a conduit, e.g., corrosive fluids, gasoline, ether, chlorine, etc., while enabling an accurate remote indication of the flow rate with no energy being taken from the fluid. It has the further advantage of requiring small space for its installation, and since it is of small weight its use in airplanes has proved highly advantageous.

The aforementioned electrocaloric flow meter is subject to a certain time lag in connection with the transfer of heat from the heater coil to the flowing medium and thence to the indicating thermometer. Improvements in such a device which result in a decrease in such time lag are much desired.

It is therefore one object of my invention to provide apparatus to automatically measure the flow of fluid in a conduit which is accurate over a very wide scale range corresponding to widely varying flow rates. It is a further object of my invention to eliminate the time lag inherent in a thermal flow meter or to substantially reduce it.

These and other objects of the invention, including the nature of the electrical arrangement and the functioning thereof, will become more readily apparent upon a reading of the description following hereinafter, and from an examination of the accompanying drawings, in which:

FIG. 1 represents a partial schematic illustration of the thermal flow meter of the invention showing details of the electrical circuit;

FIG. 2 represents a partial cross-sectional view of the coil mountings of the thermal flow meter of the invention;

FIG. 3 represents a cross-sectional view showing a modification of the coil mountings of the thermal flow meter of the invention;

FIG. 4 represents a cross-sectional view of a further modification of the coil mountings of the thermal flow meter of the invention;

FIG. 5 represents an alternate electrical circuit arrangement of the flow meter of the invention; and FIG. 6 represents a modification of a portion of the circuits shown in FIG. 5.

If heat energy is introduced into a medium flowing within a conduit and its temperature is measured both before and after the heat exchange, the difference between these two measured temperatures ($\Delta t$) will vary with the rate of flow. The differential temperature $\Delta t$ will be small for high flow rates and large for low flow rates.

With reference to FIG. 1, a conduit P is shown as the means through which the medium flows. The conduit P contains a section 1 within which the coils of the instrument are mounted. The heating means 2 and the two resistance thermometer coils 3, 4 are preferably mounted directly on conduit P where small diameter conduits are involved. However, if large quantities of fluid are to be measured, it may be desirable to employ a shunt arrangement wherein a by-pass conduit is used to tap the main conduit section. Heat is transferred to the flowing medium through a coil 2 located on the conduit P in a manner as more fully described hereinafter. The resistance thermometers 3, 4 consist of coils of thermo-responsive wire or ribbon, e.g., nickel, platinum, alloys of precious metals, etc. The reference thermometer 4 is located on the conduit preceding the heater coil in the flow stream to measure the temperature of the fluid prior to the application of heat to the fluid. A resistance thermometer 3 is located adjacent the heater means in a manner as more clearly explained in connection with FIGS. 2-4.

If the wattage input W to the coil 2 is kept constant and the temperature differential $\Delta t$ is measured, the rate of flow M would be approximately inversely proportional to $\Delta t$ and would have to be read on a meter with a non-uniform, i.e. hyperbolic scale. If, however, the temperature difference $\Delta t$ is kept constant by varying the wattage input to the heater coil, the rate of flow is practically proportional to the wattage input and can be read on the linear scale of a wattmeter 54 measuring said input.

The latter arrangement is preferred, although either method may be used in practicing my invention and is accomplished by connecting the resistance thermometers 3, 4 to a Wheatstone bridge circuit as two arms thereof, with two fixed resistances 5, 6 being provided as the ratio arms thereof. A rheostat 53 or other means is provided in series with the coil 2 and the power supply 51. The bridge circuit is kept in balance for a given temperature difference. If the balance is disturbed by a change in the rate of flow, it is restored by increasing or decreasing the wattage input to the coil 2.

Totalizing of the flow can be achieved simply by adding to the coil circuit a watthour meter 55 which will then register the total quantity of the fluid passing through section 1. Both the watt meter and watthour meter are calibrated to read flow values directly.

The device of the invention employs the boundary layer of the fluid as the medium whose temperature is measured rather than the core or body of the fluid. The operating principle may best be considered in connection with the heat transfer rate equation:

$$Q = UA\Delta T$$

where:

$Q$ = rate of heat addition, or removal,
$U$ = heat transfer coefficient,
$A$ = effective heat transfer surface area, and
$\Delta T$ = resulting temperature difference across the fluid boundary layer.

In accordance with the above equation, the best mode of operation of the flow meter of the invention will occur when the downstream thermometer 3 is located as close to the heat transfer surface as possible, and the thermal resistance between them kept at a minimum.

The flow meter may show an error due to a temperature change in the fluid (e.g., due to the flow characteristics of the boundary layer, viscosity, changing core fluid temperature). Such an error may be eliminated by placing a small coil 7 of a wire of a high temperature coefficient of electrical resistance (i.e., nickel, the resistance of which changes with temperature), around the main conduit section 1 and connecting it to one of the ratio arms of the bridge (i.e., arm 5). Thus, the ratio arm 5, the resistance of which normally would not vary with temperature, is made slightly sensitive to temperature and the Wheatstone bridge is automatically kept in balance for all temperatures within a given range, indicating unbalance only as a result of a change in the rate of flow of the flowing medium.

The coil 7 may alternately be connected in parallel to shunt the bridge or may be connected in the line between the bridge and the power supply. Furthermore, since the coil 2 consists of wire, the resistance of which does not vary with temperature, the coil 7 may shunt the coil 2 alone so that, as the temperature of the flowing medium rises in the conduit, the shunt resistance will increase and a larger share of the wattage will go into the heater coil to rebalance the bridge. The coil 7 may also be used in any of the other embodiments of the invention, even though not so shown on the drawing.

An objectionable time lag may still be present in employing a flow meter constructed as discussed above, especially in measuring large flow rates requiring large wattage consumption. This thermal lag is eliminated or at least very substantially reduced by so constructing the transmitter tube 1 of the conduit P to insure a rapid transfer of heat from the heater coil 2 to the boundary layer of the flowing medium, and thence to the indicating thermometer 3. This is also accomplished by applying the method of induction heating to the flowing medium and is particularly applicable if a high frequency A.C. is available as the source of electrical energy.

As generally indicated in FIG. 1 and in more detail in FIG. 2, the reference resistance thermometer 4 is mounted prior to the coils 2 and 3 and is wound around the transmitter section, whereas the indicating resistance thermometer 3 is embedded into the section 1. This section 1 is made of an electrically insulating material as, for example, silica, lava, steatite, stoneware, or some plastic material such as Bakelite, Lucite, etc. The coil 3 may also be embedded by a molding operation.

Fitted within the tube 1 is a metal tube 62 through which the fluid flows. This tube 62 may be of any material which is a good heat conductor and may also be of a material which is resistant to the action of corrosive fluids. The thermometer 3 is thus wound around and in close thermal contact with tube 62. In view of the heat insulating characteristics of the tube 1, the end flanges 66, 67 of the tube can be connected directly with the flanges of the adjacent sections of conduit P.

When the coil 2 is energized with alternating current of sufficiently high frequency, the metal tube 62 is inductively heated by eddy currents produced by the electromagnetic field of coil 2 and the heat is transferred rapidly and immediately to the medium within the transmitter tube.

The desirability of using a high frequency A.C. is readily apparent when it is considered that the E.M.F. induced in tube 62 is directly proportional to the rate of change in the magnetic flux linked with it. Consequently, where a high frequency A.C. is used, the flux through tube 62 changes at a high rate of lines per second and the eddy current set up will have a high value.

The heat generated by the eddy currents in tube 62 is rapidly transferred to the resistance thermometer which is wound thereon and in intimate contact therewith, and also to the fluid surface. There is thus practically eliminated any time delay between an energy flow into the induction heater coil 2, a creation of eddy currents and heat in the metal tube section 62 and a sensing of this heat input by the element 3.

In FIG. 3, the section 1 is of a plastic material and is threaded or otherwise formed at each end for assembly into a conduit. A thin metal tube or sleeve section 62' is molded into the section 1 (shown in the drawing for purposes of explanation as being somewhat thicker than it would actually be with respect to section 1). All the coils 3, 7, 2 and 4 are molded into the section 1 closely adjacent the metallic tube 62', but out of electrical contact therewith due to the insulation surrounding each coil, which insulation may be the plastic material itself. The thin sleeve protects the coils from exposure to corrosive fluids and also from the effects of fluids under high pressure, thicknesses of under 0.100" resulting in excellent response times. In this manner, even time lags due to heat transfer problems adjacent the coil 3 resulting from temperature variations due to causes other than heat input of the heating means 2, 62' may be eliminated.

As shown in FIG. 4, a metallic sleeve or tube 62" may have its ends turned up or flanged as at 63, 64 so that the edges of these flanges form part of the surface of the section 1. This is desirable where corrosive fluids are used, since the possibility exists that some leakage or seepage of flowing medium around the edges of a straight metallic sleeve (62 in FIGS. 2 or 3) may occur.

The circuit for energizing coil 2 of FIGS. 2-4 may be that of FIG. 1; however, a more convenient and practical arrangement is that shown in FIG. 5. Here again, the two resistance thermometers 3 and 4 form two arms of a Wheatstone bridge and two thermo-constant resistors 5 and 6 form the remaining arms, all as previously described in connection with FIG. 1.

The Wheatstone bridge is connected through a series resistance 76 of thermoconstant material to A.C. power source 21. The resistor can be used for adjustment and compensating purposes, or it can be omitted if desired. If the voltage of the power supply varies, which is not uncommon when tapping into power mains, there would be excessive fluctuations in the electrical circuit, and therefore, a ballast tube 77 or a constant voltage stabilizing transformer is advantageously inserted between the power supply and the Wheatstone bridge.

On the output diagonal of the bridge is placed the primary of a transformer 28, the output of which supplies, in series, a voltage amplifier 13 and a power amplifier 33. Such a voltage amplifier 13 may consist, for example, of a number of resistance coupled triodes connected in series or of several amplifier stages used in cascade, the output of one stage being fed to the grid circuit of the next, to provide amplification of the relatively weak signal from the bridge to a voltage sufficiently high to drive the grids of power amplifier 33 which forms the second stage of the electronic amplifier. Any conventional type of electronic power amplifier can be used, a satisfactory example comprising triodes operating in parallel and providing an output current sufficiently large to energize one coil of a two-phase reversible induction motor 14. The second phase 16 of the motor 14 (shown in FIG. 5) is connected to the A.C. power source by means of a capacitor 17 in order to be displaced approximately ninety degrees from the current in the first phase. As is well known, this arrangement of motor 14 has phase discriminating characteristics, and the motor will reverse its direction of rotation when the signal from the bridge goes through zero and reverses its phase.

Coil 2 is provided with a variable voltage supply and a fixed resistor 22 connected in series therewith. The variable voltage supply may be produced by a voltage regulator 20, which may be of the well known "Variac" or "Transtat" variety. These consist of a toroid shaped transformer having a plurality of taps which are connected to segments on a commutator and over which a brush or movable contact slides and from which the variable voltage for coil 2 is taken. The voltage regulator is energized from a high frequency A.C. source 21. The use of higher frequencies also permits of smaller dimensions and smaller weight for the regulator 20.

As shown in FIG. 5, the motor 14 is mechanically coupled by a means 18 to the voltage regulator 20 to control the wattage input to the coil 2. If the flow rate varies, the Wheatstone bridge of the flow meter will become unbalanced and a signal produced which is amplified as hereinabove described, and then applied to rotate the motor in one direction or the other. Since the movable contact element of the regulator 20 is mechanically connected to the motor 14, the wattage input of the coil is varied proportionately as the flow rate varies. Thus, the temperature drop between the thermometers 3, 4 is maintained constant while the wattage input to the heater is varied and the balance of the bridge is maintained.

Where a high frequency is used in supplying energy to the coil 2 (FIG. 5), a simpler means may be used to vary the wattage input to the coil than the regulator 20. In addition, any time lag appearing in the operation of a voltage regulator which is mechanically driven is eliminated by the arrangement shown in FIG. 6. The coil 2 receives its power from the high frequency A.C. source 21 through an electron tube oscillator 81. The motor 14 is mechanically coupled to a tuning circuit 80 to control the frequency of the oscillations and hence the amount of the continuous alternating current generated by the tube. For example, a Hartley circuit can be used with a magnetic feedback, which is adjusted by adjusting the magnetic coupling between coils 82 and 83. The motor rotates a tuning rod 84 to accomplish this adjustment. Thus, if the flow rate varies from the desired value, the signal produced in the Wheatstone bridge is applied to rotate motor 14 in one direction or the other. Since the tuning rod 84 is mechanically connected to the motor 14, the wattage input to the coil 2 is varied proportionately as the flow rate varies.

Although I have described certain specific illustrations of my invention, it should be understood that many changes may be made that do not depart from the spirit or scope of the invention.

What is claimed is:

1. Flow metering apparatus for measuring the flow of a confined flowing medium by measuring the temperature of the boundary layer thereof comprising flow conduit means, flow sensing means including a first and a second temperature responsive electrical resistance means, induction heating means for heating substantially only the boundary layer of the flowing medium said first temperature responsive means being responsive to the temperature of a flowing medium boundary layer prior to the transmission of heat thereto, said second temperature responsive means being located closely adjacent the area of heat transmission and repsonsive to the temperature of a flowing medium boundary layer after the transmission of heat thereto, a bridge network including the temperature responsive resistances as arms thereof, unbalance detector means connected across the diagonal of the bridge and responsive to departures of the flow from a predetermined flow rate, said conduit means including a transmitter portion containing said induction heating means and said second temperature responsive means, the induction heating means including a coil and a discrete thermally conductive thin walled element in which eddy currents are produced and which is in direct thermal contact on its inner surface with the boundary layer of the fluid and said second temperature responsive means being in intimate thermal contact with a surface of said element, whereby the thermal lag of the instrument is substantially eliminated.

2. The flow meter of claim 1 wherein said transmitter portion comprises an outer tube of an electrically insulating material and said element is an inner thearmlly conductive tube fitted within said outer tube and in direct contact with the flowing medium boundary layer.

3. The flow meter of claim 2 wherein said induction heating means also includes an induction coil wound on the outside surface of said outer tube, the second temperature responsive means being a sensing resistor molded within the said outer tube in intimate thermal contact with the outer surface of said inner tube.

4. The flow meter of claim 2 wherein said induction heating means also includes an induction coil, the first temperature responsive electrical resistance and the induction coil also being located within said outer tube in intimate thermal contact with a surface of said element.

5. The flow meter of claim 4 wherein the inner thermally conductive tube has flanges at each end thereof extending outwardly to the outer surface of the transmitter portion of said conduit means.

6. The flow meter of claim 3 wherein said means arranged in the diagonal of said bridge comprises an electronic controller means including an electric motor having phase discriminating characteristics whereby the motor will reverse its direction of rotation when the unbalance signal of the bridge goes through zero and reverses its phase, said circuit including a variable voltage supply means connected in series with said induction coil and structurally interconnected with said motor, whereby the wattage input of the induction coil is varied proportionately as the unbalance signal varies due to a change in the flow rate.

7. The flow meter of claim 1 wherein said means arranged in the diagonal of said bridge comprises an electronic controller means including an electric motor having phase discriminating characteristics whereby the motor will reverse its direction of rotation when the unbalance signal of the bridge goes through zero and reverses its phase, said circuit including a variable voltage supply means connected in series with said induction coil and structurally interconnected with said motor, whereby the wattage input of the induction coil is varied proportionately as the unbalance signal varies due to a change in the flow rate.

8. Flow metering apparatus for measuring the flow of a confined flowing medium by measuring the temperature of the boundary layer thereof, comprising, in combination: flow conduit means providing an unrestricted flow path for said flowing medium, whereby a boundary layer is caused to flow adjacent the inner circumference of said flow conduit means; flow sensing means including a first and a second temperature responsive means; induction heating means for heating substantially only the boundary layer of the flowing medium; said first temperature responsive means being responsive to the temperature of the flowing medium boundary layer prior to the transmission of heat thereto; said second temperature responsive means being located closely adjacent the area of heat transmission and responsive to the temperature of the flowing medium boundary layer after the transmission of heat thereto; means responsive to said first and second temperature responsive means for providing an indication of the temperature difference between the first and second temperature responsive means; the induction heating means including a thermally conductive element in which eddy currents are produced and which is in heat transfer relationship with the boundary layer of the fluid; and said second temperature responsive means is in intimate thermal contact with a surface of said element, whereby the thermal lag of the instrument is substantially eliminated.

References Cited in the file of this patent

UNITED STATES PATENTS

| 2,892,347 | Laprand | June 30, 1959 |

FOREIGN PATENTS

| 601,298 | Great Britain | May 3, 1948 |
| 629,789 | Great Britain | Sept. 28, 1949 |
| 651,152 | Great Britain | Mar. 14, 1951 |
| 1,093,423 | France | Nov. 17, 1954 |